United States Patent Office 2,840,598
Patented June 24, 1958

2,840,598

NEW BUTENE DERIVATIVE AND THEIR PREPARATION

Herbert Schwartz, Vineland, N. J., assignor to Vineland Chemical Company, Vineland, N. J., a firm No Drawing. Application March 29, 1956
Serial No. 574,611

7 Claims. (Cl. 260—487)

This invention relates to novel chemical compounds which are valuable pesticides or pest control agents, and more particularly to new 1,4-substituted 2-butene derivatives possessing valuable fungicidal, germicidal and herbicidal properties. The term pesticide as employed herein means a chemical compound or substance for combating and destroying pests such as fungi, bacteria or germs, noxious grass or weeds, and like pests.

It is the principal object of this invention to provide new chemical compounds that possess valuable pesticidal properties.

Another object of this invention is to provide new chemical compounds that possess valuable fungicidal, germicidal and herbicidal properties.

Still another object of this invention is to provide new chemical compounds which exhibit valuable systemic fungicidal activity in growing plants.

Further objects, including the provision of a method for making the novel compounds, will become apparent from a consideration of the following specification and claims.

The novel chemical compounds of the present invention are 1,4-substituted 2-butene derivatives having the general structural formula:

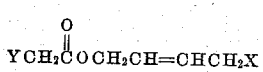

wherein X represents a substituent selected from the group consisting of hydroxy, chlorine, bromine and a substituted acetoxy radical of the general structural formula:

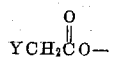

and Y represents a substituent selected from the group consisting of chlorine, bromine, and iodine.

The novel compounds of this invention are substituted monoesters, diesters and mixed esters which may be derived from 2-butene-1,4-diol. Inasmuch as the compounds of this invention are unsaturated, they exist as both the cis and trans isomers. However, it was found that this isomerism has no noticeable influence on the pesticidal activity of these compounds, both the cis and trans isomers of the various compounds exhibiting substantially equally high pesticidal activity.

Typical of the mono or half ester compounds of this invention are the cis and trans isomers of 1-chloracetoxy-2-butene-4-ol; 1-bromacetoxy-2-butene-4-ol; 1-iodoacetoxy-2-butene-4-ol, and similar compounds wherein the hydroxy group is replaced by a halogen such as chlorine or bromine as for example 1-bromacetoxy-2-butene-4-chloride, and 1-chloracetoxy-2-butene-4-bromide. Typical of the diesters are the cis and trans isomers of 1,4-bis-bromacetoxy-2-butene; 1,4-bis-chloracetoxy-2-butene, and 1,4-iodoacetoxy-2-butene. Mixed esters include among others the cis and trans isomers of 1-bromacetoxy-2-butene-4-chloracetate, and 1-bromacetoxy-2-butene-4-iodoacetate.

All the compounds covered by the general formula set forth above, both the cis and trans isomers, possess valuable fungicidal properties. They can, therefore, be used as active ingredients in fungicidal preparations for therapeutic purposes or for technical uses, e. g. the preservation of foodstuff or books, articles of clothing or other objects to be preserved from the action of mold or other fungi, or for agricultural or horticultural purposes or the like. The compounds of this invention are particularly valuable for use in agriculture or horticulture, for they are systemic fungicides, i. e. the compounds of this invention are found to enter the plant and pass throughout the plant by means of the plant's internal sap system. Thus, these fungicides protect plants from fungus from within, the compounds entering the plant, for example by its roots along with nourishment absorbed by the plant. Compounds of my invention, evidencing particularly high fungistatical activity are the cis and trans isomers of 1,4-bis-bromacetoxy-2-butene; 1-bromacetoxy-2-butene-4-ol, and 1-bromacetoxy-2-butene-4-chloride.

Compounds of this invention, in addition to possessing valuable fungicidal properties, have also been found to exhibit extremely valuable herbicidal and germicidal activity. For example, both the cis and trans isomers of 1,4-bis-bromacetoxy-2-butene and 1,4-bis-chloracetoxy-2-butene exhibit herbicidal activity. In addition, cis-1-bromacetoxy-2-butene-4-ol possesses valuable germicidal properties.

The compounds of this invention may form an active ingredient of various fungicidal, germicidal or herbicidal preparations such as by forming a mixture of the active ingredient with a solid or liquid inert iarrier material, or if desired the active ingredient may be dissolved in a suitable solvent and the resulting solution used as such or formed into a suitable emulsion with water. Also, the compounds of this invention may be combined with other fungicidal, herbicidal and/or germicidal agents whereby composite or multipurpose preparations are thereby provided.

In preparing the mono or half ester compounds of this invention, either cis or trans 2-butene-1,4-diol is esterified with about an equimolecular amount of a substituted acetic acid compound selected from the group consisting of chloracetic, bromacetic and iodoacetic acid, the esterification taking place in a suitable organic solvent medium such as benzene. The esterified product will be either the cis or trans isomer depending upon which particular 2-butene-1,4-diol isomer is utilized as a reactant. It is remarkable that when the diol used as the starting material is thus esterified with an equimolecular amount of substituted acetic acid, such as bromacetic acid, the esterification takes place in one of the 1- and 4-positions only, with the complete exclusion of esterifications in the other of said positions.

The diesters are prepared in a manner similar to that employed in the preparation of the mono esters, however, at least about twice the molecular equivalent of the diol of substituted acetic acid is employed. The resulting diester will be in the form of the cis or trans isomer, depending upon which isomer of 2-butene-1,4-diol is employed. The cis isomer of the diester can be changed to the trans isomer by treatment of the cis isomer product with bromine in an organic solvent, such as benzene, at room temperature, and then distilling off the bromine and solvent. Warming as by distillation favors rearrangement.

Mixed esters, such as 1-bromacetoxy-2-butene-4-chloracetate, can be prepared by esterifying the mono ester, e. g. 1-bromacetoxy-2-butene-4-ol with a substituted acetic acid, such as chloracetic acid in a suitable organic solvent reaction medium.

The above described esterification reactions may be carried out at a temperature from about 70° C. to about 90° C., and preferably at a temperature not substantially above about 85° C.

The hydroxy group of the mono or half ester can be replaced by a halogen selected from the group consisting of chlorine and bromine by halogenating a 1-substituted acetoxy-2-butene-4-ol compound with a halogenating agent such as thionyl chloride or thionyl bromide. For example, 1-bromacetoxy-2-butene-4-chloride can be prepared by halogenating 1-bromacetoxy-2-butene-4-ol with thionyl chloride.

The compounds of the present invention and their preparation will be more clearly understood from a consideration of the following specific examples, which are given for the purpose of illustration only and are not to be considered as limiting the scope of the invention in any way.

EXAMPLE I 1 mole of cis-2-butene-1,4-diol and 2 moles of bromacetic acid are dissolved in 500 cc. of benzene. Esterification occurs spontaneously. The water formed in the course of the reaction is separated whereby the equilibrium of the reaction is shifted towards the ester formation and virtually all the diol is esterified. After the completion of the reaction the benzene is distilled off and the residue is washed first with dilute sodium bicarbonate solution and then with water until the washing water is neutral. In this manner, crude cis-1,4-bis-bromacetoxy-2-butene is obtained. It is dried over calcium chloride and purified by distillation in a high vacuum. The purified ester is a colorless liquid of B. P. 135–136° C. under 0.005 mm. Hg. Its index of refraction is $n_{20}^D = 1.5223$. The yield of purified ester is about 90% of the theoretical yield.

EXAMPLE II

Treatment of cis-1,4-bis-bromacetoxy-2-butene with bromine in benzene at room temperature produces the trans isomer which is a crystalline solid of M. P. 56–58.5° C.

EXAMPLE III 1 mole of cis-2-butene-1,4-diol and 2 moles of chloracetic acid are dissolved in 500 cc. of benzene. Esterification occurs spontaneously. The water formed in the course of the reaction is separated whereby the equilibrium of the reaction is shifted towards the ester formation and virtually all the diol is esterified. After the completion of the reaction, the benzene is distilled off and the residue is washed first with dilute sodium bicarbonate solution and then with water until the washing water is neutral. In this manner, crude cis-1,4-bis-chloracetoxy-2-butene is obtained. It is dried over calcium chloride and purified by distillation in a high vacuum. The purified ester is a colorless liquid of B. P. 107–108° C. under 0.005 mm. Hg. The yield of purified ester is about 90% of the theoretical yield.

EXAMPLE IV

Treatment of cis-1,4-bis-chloracetoxy-2-butene with bromine in benzene at room temperature produces the trans isomer which is a colorless crystalline solid M. P. 68–71° C.

EXAMPLE V 1 mole of cis-2-butene-1,4-diol and 2 moles of iodoacetic acid are dissolved in 500 cc. of benzene. Esterification occurs spontaneously. The water formed in the course of the reaction is separated whereby the equilibrium of the reaction is shifted towards the ester formation and virtually all the diol is esterified. After the completion of the reaction, the benzene is distilled off under vacuum at a temperature below about 50° C., and the residue is washed first with dilute sodium bicarbonate solution and then with water until the washing water is neutral. In this manner, crude cis-1,4-bis-iodoacetoxy 2-butene is obtained. It is dried over calcium chloride and purified by distillation in a high vacuum. The yield of purified ester is about 90% of the theoretical yield.

EXAMPLE VI

Treatment of cis-1,4-bis-iodoacetoxy-2-butene with bromine in benzene at room temperature produces the trans isomer.

EXAMPLE VII 7.0 g. of dihydrofuran and 0.5 g. of zinc dust are placed in a flask equipped with a reflux condenser. About 15.7 g. of bromacetyl chloride are added to the flask in a plurality of small amounts. After conclusion of the reaction, the reaction mixture is warmed for about five minutes, and poured into a separatory funnel containing water with which the reaction mixture is thoroughly mixed by agitation of the flask. Ethylene chloride is added to the flask, and then a sodium bicarbonate solution is added to neutralize excess acetic and hydrochloric acids present. About 22.5 g., representing a yield of about 99% of cis-1-bromacetoxy-2-butene-4-chloride is obtained by vacuum distillation. The product is a liquid, B. P. 97° C. at 10 mm. Hg and index of refraction $n_{20}^D = 1.5059$.

EXAMPLE VIII 2 moles of cis-2-butene-1,4-diol and 1 mole of bromacetic acid are dissolved in 350 cc. of benzene. The water is removed in the course of the reaction. After the completion of the reaction, the benzene is distilled off in vacuo. The residue is washed with a concentrated potassium chloride solution which dissolves any unreacted diol while the reaction product remains virtually undissolved. The cis-1-bromacetoxy-2-butene-4-ol so obtained is dissolved in ether and the solution is dried over sodium sulfate. The yield is equal to the theoretical yield calculated for bromacetic acid. The cis-1-bromacetoxy-2-butene-4-ol is a colorless liquid which on standing tends to assume a slightly brownish color. It boils at 76–78° C. under 0.001 mm. Hg. Its index of refraction is $n_{20}^D = 1.5023$.

EXAMPLE IX

In an analogous manner as described in Example VIII, the trans-1-bromacetoxy-2-butene-4-ol is obtained from trans-2-butene-1,4-diol. The reaction product is solid at ordinary temperature. M. P. 59–60° C. Index of refraction $n_{20}^D = 1.502$.

EXAMPLE X

In a similar manner as described in Example VIII, cis-1-chloracetoxy-2-butene-4-ol is obtained from cis-2-butene-1,4-diol and chloracetic acid. The reaction product is a colorless liquid, and boils at 77–78° C. under 0.002 mm. of Hg.

EXAMPLE XI

In a manner analogous to that described in Example VIII, trans-1-chloracetoxy-2-butene-4-ol is obtained from trans-2-butene-1,4-diol and chloracetic acid. The reaction product is solid at ordinary temperature.

EXAMPLE XII

In an analogous manner as described in Example VIII, cis-1-iodoacetoxy-2-butene-4-ol is obtained from cis-2-butene-1,4-diol and iodoacetic acid. The reaction product is a liquid.

EXAMPLE XIII

In a manner similar to that described in Example VIII, trans-1-iodoacetoxy-2-butene-4-ol is prepared from trans-2-butene-1,4-diol and iodoacetic acid. The reaction product is a solid at ordinary temperature.

EXAMPLE XIV 21 g. of trans-1-bromacetoxy-2-butene-4-ol, the reaction product according to Example IX, is dissolved in chloroform and 15 g. of thionyl chloride is added to the solution. The reaction vessel is connected to a reflux condenser. The reaction proceeds first mildly exothermally. When the evolution of heat has ceased, the reaction mixture is boiled with reflux for 30 minutes. It is thereafter poured into water and the mixture is neutralized with sodium carbonate solution. The chloroform layer is then separated and dried over calcium chloride. After the evaporation of the chloroform in vacuo there remains 22 g. of trans-1-bromacetoxy-2-butene-4-chloride. This is a slightly yellowish, lachrymatory liquid of B. P. 80° C./0.01 mm. Hg, and index of refraction $n_{20}^D = 1.4915$.

EXAMPLE XV

In an analogous manner as described in Example XIV, cis-1-bromacetoxy-2-butene-4-chloride is prepared from cis-1-bromacetoxy-2-butene-4-ol, the reaction product according to Example VIII. This is a liquid of B. P. 97° C./10 mm. Hg and index of refraction $n_{20}^D = 1.5059$.

EXAMPLE XVI

In an analogous manner as described in Example XIV, trans-1-chloracetoxy-2-butene-4-chloride is prepared from trans-1-chloracetoxy-2-butene-4-ol, the reaction product according to Example XI. The reaction product is a liquid at ordinary temperatures.

EXAMPLE XVII

In an analogous manner as described in Example XIV, cis-1-chloracetoxy-2-butene-4-chloride is prepared from cis-1-chloracetoxy-2-butene-4-ol, the reaction product according to Example X. The reaction product is a liquid at ordinary temperature.

EXAMPLE XVIII

In a manner similar to that described in Example XIV, cis-1-iodoacetoxy-2-butene-4-chloride is prepared from cis-1-iodoacetoxy-2-butene-4-ol, the reaction product according to Example XII. The reaction product is a liquid at ordinary temperature.

EXAMPLE XIX

In a manner analogous to that described in Example XIV, trans-1-iodoacetoxy-2-butene-4-chloride is prepared from trans-1-iodoacetoxy-2-butene-4-ol, the reaction product according to Example XIII. The reaction product is a liquid at ordinary temperature.

EXAMPLE XX

In an analogous manner as described in Example XIV, trans-1-chloracetoxy-2-butene-4-bromide is obtained from trans-1-chloracetoxy-2-butene-4-ol, the reaction product of Example XI, and thionyl bromide. The product is a liquid at ordinary temperature.

EXAMPLE XXI

In a manner similar to that described in Example XIV, cis-1-chloracetoxy-2-butene-4-bromide is obtained from cis-1-chloracetoxy-2-butene-4-ol, the reaction product of Example X, and thionyl bromide. The product is a liquid at ordinary temperatures.

EXAMPLE XXII

In a manner analogous to that described in Example XIV, trans-1-bromacetoxy-2-butene-4-bromide is obtained from trans-1-bromacetoxy-2-butene-4-ol, the reaction product of Example IX, and thionyl bromide. The product is a liquid at ordinary temperatures.

EXAMPLE XXIII

In a manner analogous to that described in Example XIV, cis-1-bromacetoxy-2-butene-4-bromide is obtained from cis-1-bromacetoxy-2-butene-4-ol, the reaction product of Example VIII, and thionyl bromide. The product is a liquid at ordinary temperatures.

EXAMPLE XXIV

In an analogous manner as described in Example XIV, trans-1-iodoacetoxy-2-butene-4-bromide is prepared from trans-1-iodoacetoxy-2-butene-4-ol, the reaction product of Example XIII, and thionyl bromide. The product is a liquid at ordinary temperatures.

EXAMPLE XXV

In an analogous manner as described in Example XIV, cis-1-iodoacetoxy-2-butene-4-bromide is prepared from cis-1-iodoacetoxy-2-butene-4-ol, the reaction product of Example XII, and thionyl bromide. The product is a liquid at ordinary temperatures.

The fungicidal activity of the products according to the invention was ascertained with *Botrytis cinera* Pers. as a test fungus. Tests were made both on solid and liquid substrates. The solid substrate was prepared by boiling 4 g. of agar-agar with 8 g. of maltose in 200 cc. of water for 3 hours and adding 2 g. of peptone about 5 to 10 minutes before interrupting the heating. On being allowed to cool the mixture remains a viscous liquid down to about 40° C., and jellifies on further cooling to room temperature. The liquid substrate was prepared in the same way but without agar-agar.

The fungus was prepared for the test by transferring a pure-culture mycelium into pure water by means of a platinum needle and then filtering the water through glass wool which retained the mycelium but allowed the spores to pass. The filtrate was diluted so as to contain about 500 spores per drop.

Solid-substrate tests were made in Petri dishes of 5 cm. diameter with 5 cc. of the agar-agar substrate each. Liquid tests were made in test tubes with 5 cc. of substrate solution each.

The fungicide compounds were used in solution, e. g. in water or in a mixture of acetone and tertiary butyl alcohol. The concentration was 1:50000, calculated for the whole test medium. Inoculation was effected with 1 drop of the suspension of spores for each Petri dish or test tube.

It was found that the fungicides inhibited the growth of the fungus for periods from 6 to 29 days, calculated from the beginning of growth on or in the substrate not admixed with the fungicide.

Results of these tests are set forth in Table I. In this table, the results obtained with the compounds of this invention are compared with those obtained with the known fungicides, salicylic acid and pentachlorophenol. The effectiveness of the compounds of the present invention is readily apparent by a comparison of the results obtained by them with those obtained with pentachlorophenol, which is known to be an extremely effective fungicide.

Table 1

| Isomer | Formula | Days Inhibition after Germination of Control (Concentration—1: 50,000) | |
|---|---|---|---|
| | | Culture Medium | |
| | | Solid | Liquid |
| Cis | ClCH₂COOCH₂CH=CHCH₂OCOCH₂Cl | 4 | |
| Trans | ClCH₂COOCH₂CH=CHCH₂OCOCH₂Cl | 4-5 | |
| Cis | ClCH₂COOCH₂CH=CHCH₂OH | 4 | |
| Cis | BrCH₂COOCH₂CH=CHCH₂OCOCH₂Br | 6-12 | |
| Trans | BrCH₂COOCH₂CH=CHCH₂OCOCH₂Br | 10-12 | |
| Trans | BrCH₂COOCH₂CH=CHCH₂Cl | 11-15 | 11-28 |
| Trans | BrCH₂COOCH₂CH=CHCH₂OH | 8-17 | 11-19 |
| Cis | BrCH₂COOCH₂CH=CHCH₂OH | 12-29 | |
| *Standards* | | | |
| | o-C₆H₄(OH)COOH | 2 | |
| | C₆Cl₅OH | 4-18 | |

As stated previously, the bromacetate butene-2-derivatives exhibit germicidal activity. For example, a Petri plate containing nutrient agar-agar and one part in 10,000 of 1-bromacetoxy-2-butene-4-ol prevented the growth of the organism *Bacillus subtilis*, when incubated at 37° C. for a period of seven days. Similar results were obtained with 1-bromacetoxy-2-butene-4-ol in liquid medium under like conditions. In both instances, a similar sample not containing the germicide grew luxuriantly. Bis-1,4-bromacetoxy-2-butene was tested as a germicide on bacteria obtained from a paper mill, and this compound was found to effectively inhibit the growth of the bacteria at 10 p. p. m. in liquid medium.

The bromacetate and chloracetate butene-2-derivatives of this invention have been found to possess valuable herbicidal properties. As an example of such activity, nettles have been killed with a 0.1% aqueous solution of bromacetoxy-2-butene-4-ol and 1-chloracetoxy-2-butene-4-ol. Concentrated aqueous solutions of such compounds are also effective herbicidal preparations.

Some modification is possible in the selection of the various substituents and combinations thereof as well as in the particular procedure employed in preparing the compounds without departing from the scope of the invention.

I claim:
1. A 1,4-substituted 2-butene derivative having the general structural formula:

wherein X represents a substituent selected from the group consisting of hydroxy, chlorine, bromine and a bromacetoxy group.

2. 1-bromacetoxy-2-butene-4-ol.
3. 1-bromacetoxy-2-butene-4-chloride.
4. 1,4-bis-bromacetoxy-2-butene.
5. A process for the preparation of 1-bromacetoxy-2-butene-4-ol which comprises esterifying 2-butene-1,4-diol with about an equimolecular amount of bromacetic acid.
6. A process for preparing the cis isomer of 1,4-bis-bromacetoxy-2-butene which comprises esterifying the cis isomer of 2-butene-1,4-diol with at least about twice the molecular equivalent of said diol of bromacetic acid.
7. A process for the preparation of the trans isomer of a 1,4-bis-bromacetoxy-2-butene which comprises treating cis-1,4-bis-bromacetoxy-2-butene with bromine in an inert organic solvent.

References Cited in the file of this patent
UNITED STATES PATENTS

| 2,366,667 | Deebel | Jan. 2, 1945 |
| 2,683,660 | Schlesinger | July 13, 1954 |
| 2,691,672 | Brust | Oct. 12, 1954 |

OTHER REFERENCES

Arbuzov et al.: Chem. Abstracts 41 (1947), 3751 g–i.
Fusco et al.: Gazz. Chim. ital 79 (1949), 843–44.
Wagner et al.: "Synthetic Organic Chemistry" (1953), p. 92.